Feb. 2, 1943.  S. A. SNELL  2,309,796
STEERING COLUMN BRAKE ACTUATOR
Filed Feb. 24, 1940
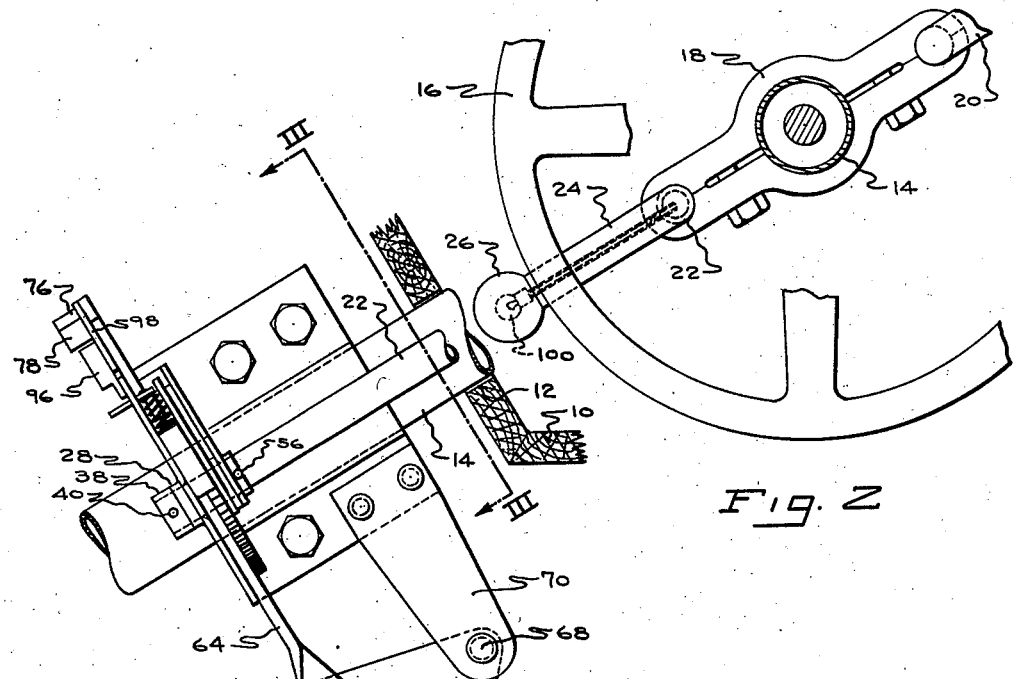
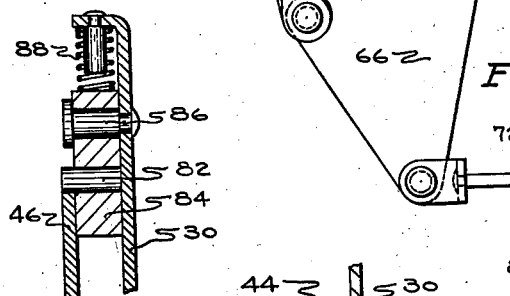
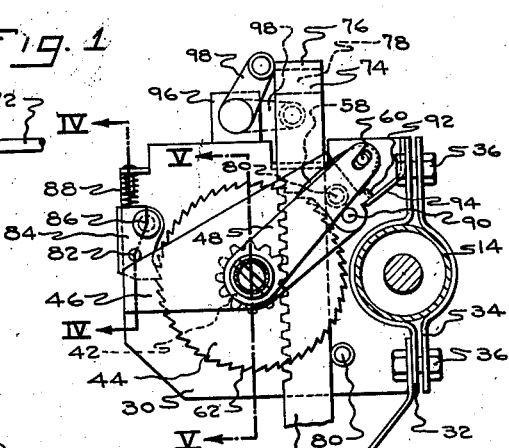
Inventor
SAMUEL A. SNELL
By Beaman & Langford
Attorneys Patented Feb. 2, 1943

2,309,796

UNITED STATES PATENT OFFICE 2,309,796

STEERING COLUMN BRAKE ACTUATOR

Samuel A. Snell, Jackson, Mich., assignor to Townsend F. Beaman, Jackson, Mich., as trustee Application February 24, 1940, Serial No. 320,589

2 Claims. (Cl. 74—485)

The present invention relates to parking brake structure for automobiles, being concerned with the type broadly disclosed in my co-pending application, Serial No. 253,985, filed February 1, 1939, and being an embodiment of my co-pending application, Serial No. 308,609, filed December 11, 1939.

In order to provide more leg room in the driver's compartment of an automobile, the gear shift lever has been removed from its floor mounting in a great many automobiles now being manufactured and mounted upon the steering column below but directly adjacent the steering wheel where it may be conveniently operated. To accomplish a similar result, the parking brake lever has likewise been removed from its floor mounting and the operating lever in commercial construction is now pivoted at a point back of the instrument panel and above the floor of the automobile and swings outwardly and upwardly into the driver's compartment when the parking brake is applied. Where this lever is located to the left of the driver, if it is within convenient reach with the brakes released when the brakes are applied the lever projects outwardly into the doorway and interferes with the driver's legs upon entering and leaving the driver's seat.

It is the object of the present invention to provide an improved parking brake actuator which is mounted upon the steering column with the hand lever directly beneath the steering wheel in position to be conveniently operated by the left hand of the driver, yet will in no way interfere with the steering operation. Preferably, the brakes will be applied through a ratcheting action of the hand lever, such action enabling the lever to be rotated at all times out of the way of the driver's knees whether the brakes are applied or released. My improved brake actuator also enhances the appearance of the steering column by balancing the present gear shift lever which it may resemble in appearance and location.

Another object of the invention is to provide a parking brake actuator in which the hand lever is located on the steering column and directly below the steering wheel and connects through motion transmitting structure a motion reducing unit coupled with the brakes and located adjacent the lower end of the steering column.

Another object is to provide a parking brake actuator comprising a swinging hand lever which rotates a relatively long shaft for driving a motion reducing mechanism connected to the brakes through a pawl and ratchet structure.

A still further object is to provide novel means for indicating to the driver the application of the brakes, particularly adapted to parking brake actuators of a type in which the hand grip has a non-releasing return stroke.

These and other objects and advantages residing in the combination, construction and arrangement of parts will appear from a consideration of the accompanying drawing when considered in the light of the detailed specification and annexed claims.

In the drawing wherein a single embodiment of the invention is illustrated in order that the principles of the invention may become known, Fig. 1 is a cross-sectional view through the floor of a driver's compartment of an automobile, showing in broken elevation, the improved brake actuator, Fig. 2 is a fragmentary plan view of a steering column and wheel as viewed by the driver showing the parking brake lever mounted upon the steering column, Fig. 3 is a cross-sectional view taken on line III—III of Fig. 1, Fig. 4 is a fragmentary cross-sectional view taken on line IV—IV of Fig. 3, and Fig. 5 is a corss-sectional view through the motion reducing unit taken on line V—V of Fig. 3.

Referring to the drawing, in Fig. 1, the floor of the driver's compartment is indicated by reference character 10, having an opening 12 through which the steering column 14 extends, all in a well known manner. The steering wheel 16 is supported at the upper end of the steering column in a known manner. Directly below the steering wheel 16 is a suitable guide or bearing bracket 18. This bracket 18 is shown as serving as a bearing for the gear shift lever 20 of any well known construction. On the opposite side, the bracket serves as a bearing for the upper end of the brake actuator rod 22 which has connected thereto at its upper end, a hand lever 24 with a knob 26. The lower end of the rod 22 is supported for rotation in the sleeve portion 28 integrally formed in the sheet metal base 30. The base 30 has a mounting flange 32 shaped to the steering column to enable the base 30 to be clamped to the steering column 14 by bolting the flange 32 to a similarly shaped plate 34. Bolts 36 rigidly clamp the base 30 to the steering column 14. A collar 38 secured to the lower end of the rod 22 by a pin 40 prevents axial displacement of the rod 22 in an upward direction.

As more clearly shown in Fig. 5, a relatively small pinion 42 is pinned or otherwise secured for unitary movement to a ratchet wheel 44. This ratchet wheel and pinion unit is axially supported upon the rod 22 for both unitary and relative rotation with reference to the rod 22. Adjacent the ratchet wheel 44 is a freely pivoted pawl releasing plate 46 which is spaced from the pawl arm 48 by a washer 50. One of the sides of the pawl arm 48 adjacent an opening 52 therethrough is slotted at 54 to receive the lock pin 56 which extends through diametrically opposed openings 58 in the tube 22 for the purpose of rigidly attaching the pawl arm 48 to the rod 22. A pawl 59 is pivoted at 60 to the outer end of the pawl arm 48 and engages with the teeth 62 of the ratchet wheel 44 to rotate the pinion 42 which meshes with the rack 64. The rack 64 is connected at its lower end to the pivoted plate 66 pivoted at 68 to the bracket 70. Axial upward movement of the rack 64 will rock the plate 66 about its pivot 68 to exert a brake applying movement upon the element 72 extending to the brakes (not shown). The upper half 74 of the rack 64 is flanged at 76 to which a rubber bumper 78 is attached to limit the movement of the rack 64 at the time of brake release. Pins 80 guide the rack 64 and hold the same in mesh with the pinion 42.

To apply the brakes, the driver swings the lever 24 counterclockwise from the position shown in Fig. 2. By oscillating the lever 24 between positions corresponding to the hours of 7 o'clock and 9 o'clock upon a clock the ratchet wheel 44 and the pinion 42 will be advanced by a step by step movement to a position fully applying the brakes. Whether one or more oscillations of the lever 24 will be required to fully apply the brakes will depend upon the adjustment of the brake, the arc of the oscillation and the mechanical advantage desired.

For releasing the brakes the lever 24 is moved clockwise from the position shown in Fig. 2 to a position approximating 10 o'clock. In this position, the arm 48 is moved clockwise to rock the plate 46 which engages a pin 82 on the holding pawl 84 to lift the same from the teeth of the wheel 44. The pawl 84 is pivoted at 86 with a spring 88 for urging the same toward the wheel 44. To connect the arm 48 to the plate 46, the pawl 59, in addition to being pivoted at 60, is also pivoted at 90 to the plate 46. Preferably the pivotal connection between the pawl 59 and the arm 48 is through a pin acting in a slightly elongated slot with the side arcs of a circle with their centers at the pivotal point 90. This arrangement permits the pawl 59 to pivot above the point 90 lifting the pawl 59 from the teeth of the ratchet wheel when the arm 48 is moved clockwise from the position shown in Fig. 3. It is to be understood that clockwise movement of the plate 46 is resisted through engagement between the tab 92 on the plate 46 and the spring 94 to return the lever 24 to the position shown in Fig. 2 following brake release.

As the lever 24 may be located in the position shown in Fig. 2 with the brakes applied as well as released, the driver can not determine the state of his parking brakes from inspection of the position of the lever 24. To avoid driving the automobile with the brake applied, a suitable electrical switch 96 is provided having an arm 98 which is continuously spring urged toward the rack 64. In Fig. 3, the rack 64 is in a brake applied position with the arm 98 raised to close the electrical circuit which together with conduits (not shown) includes a small electric light bulb 100 housed within the knob 26 of translucent material. In practice the circuit in which the bulb 100 is located is connected through the ignition switch of the automobile so as to light the bulb only when the ignition switch is on and the brakes are applied. As the knob 26 is directly in front of the driver he will be promptly advised of the state of his parking brakes.

Having described my invention, what I desire to protect by Letters Patent and claim is:

1. In a parking brake system for association with an automobile having a steering column carrying a steering wheel, a parking brake actuator comprising a shaft of substantial length for extending along the said column to a point adjacent the underside of the steering wheel, a lever connected to said shaft for at least partially rotating the said shaft and accessible for swinging movement by the driver directly below the steering wheel, a motion reducing mechanical advantage providing unit located at the lower end of said shaft and connected thereto, a connection between said unit and the brake, said motion reducing unit comprising clutching mechanism brake applying means operable when said lever is swung through one arc in one direction, and brake releasing means operative when said lever is swung through another arc in the opposite direction.

2. In a parking brake system for association with an automobile having a steering column carrying a steering wheel, a parking brake actuator comprising a hand lever located directly beneath the steering wheel, means supporting the said lever for movement by the driver, means for transferring motion of the said lever from adjacent the under side of the steering wheel to a point adjacent the lower end of the steering column, motion reducing mechanical advantage providing mechanism located adjacent the lower end of said steering column, said motion reducing mechanism comprising ratchet brake applying means operable each time said lever is swung through one arc in one direction, and brake releasing means operative when said lever is swung through another arc in the opposite direction.

SAMUEL A. SNELL.